Figure 35:
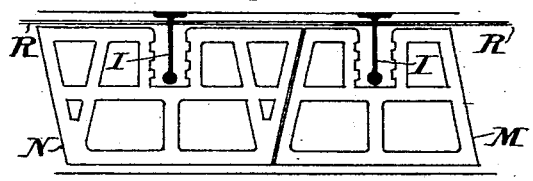

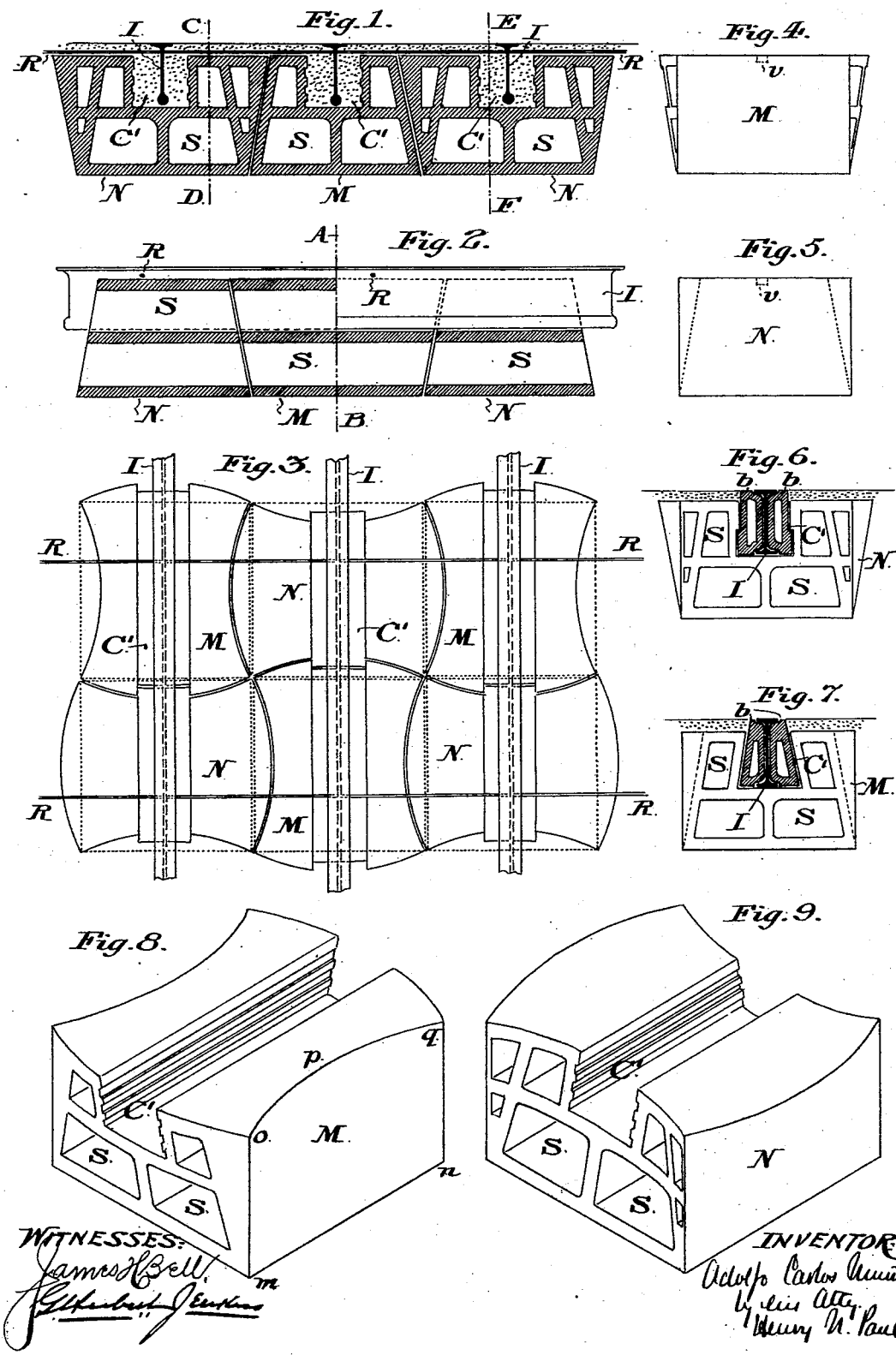

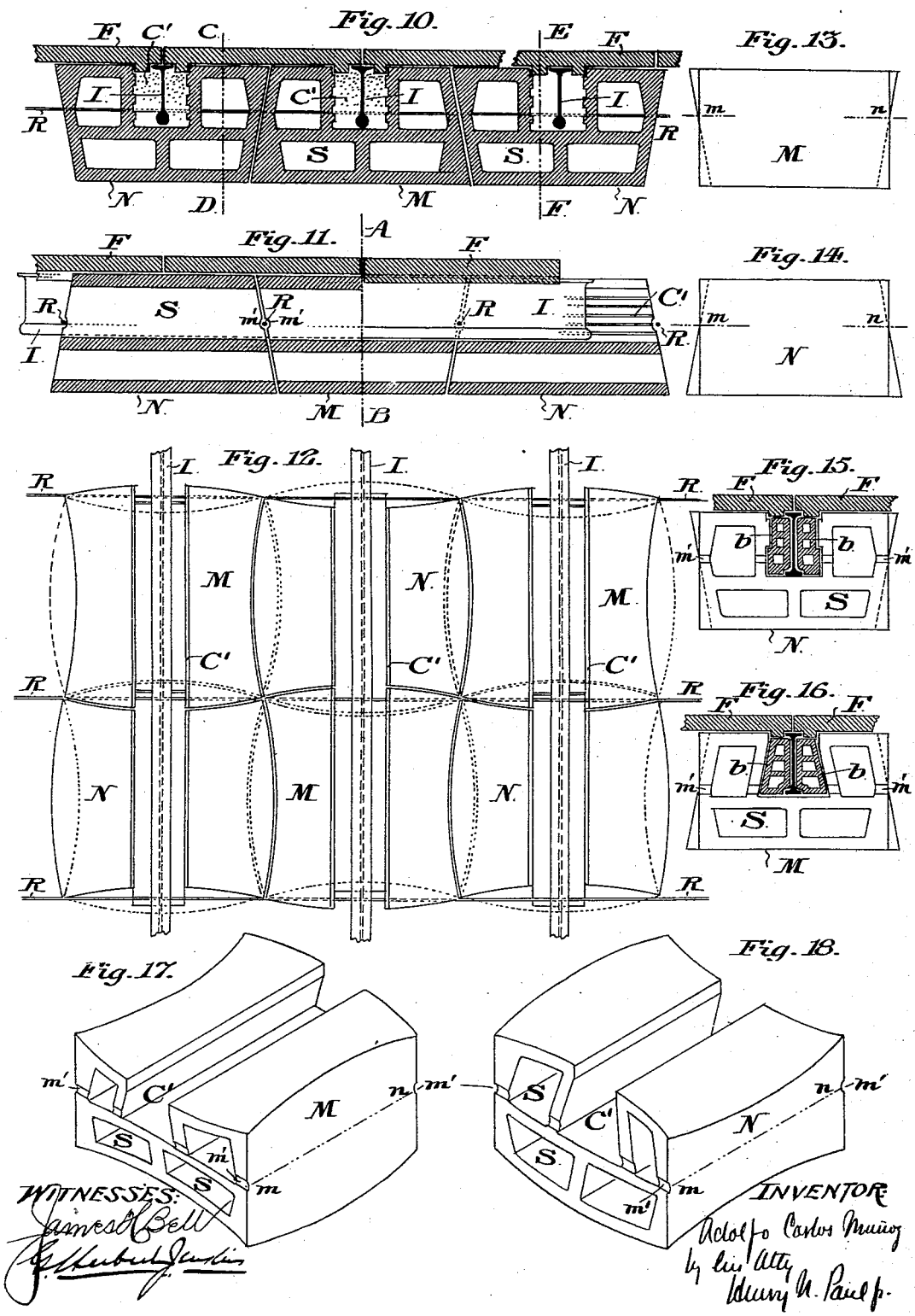

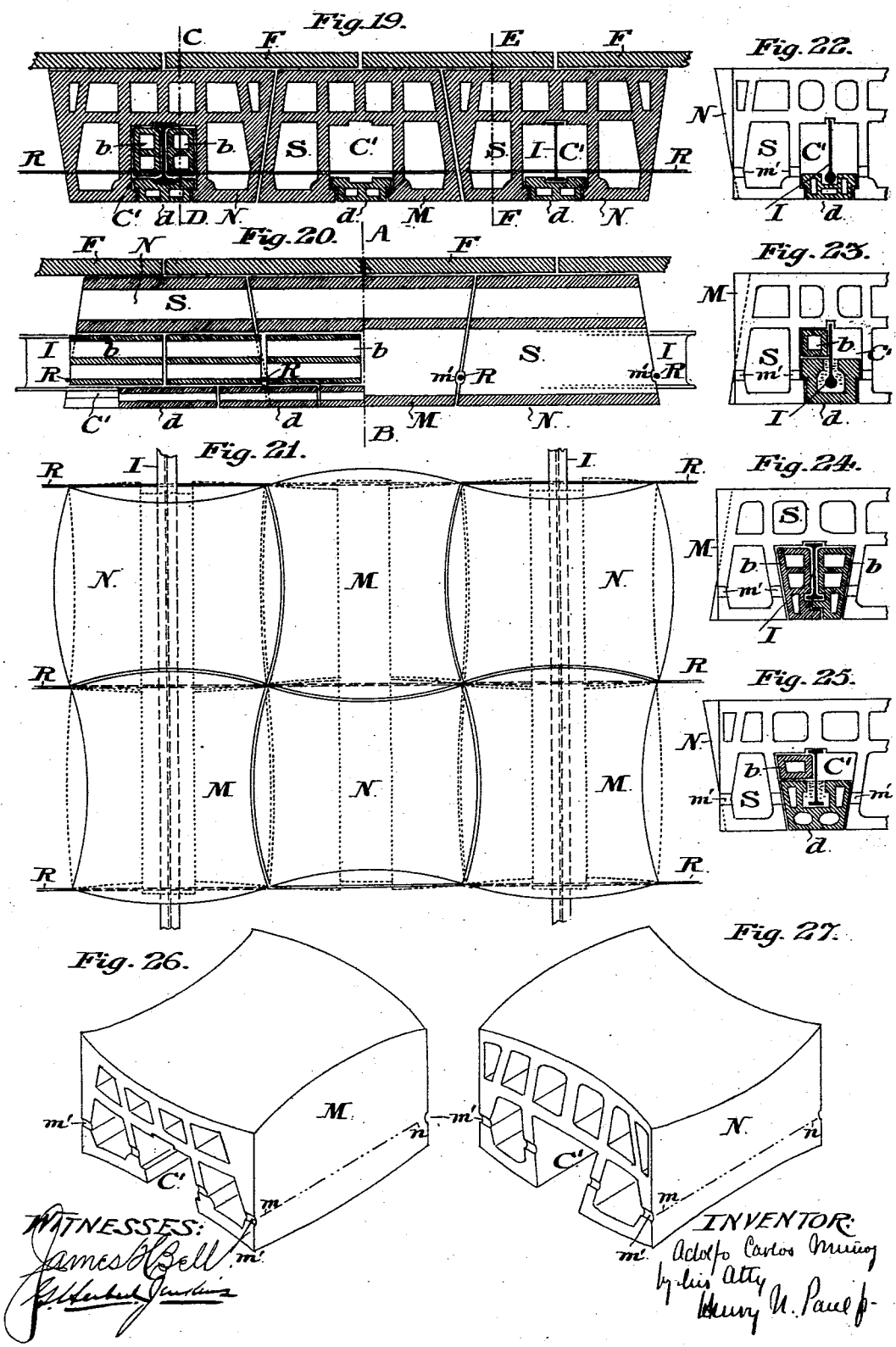

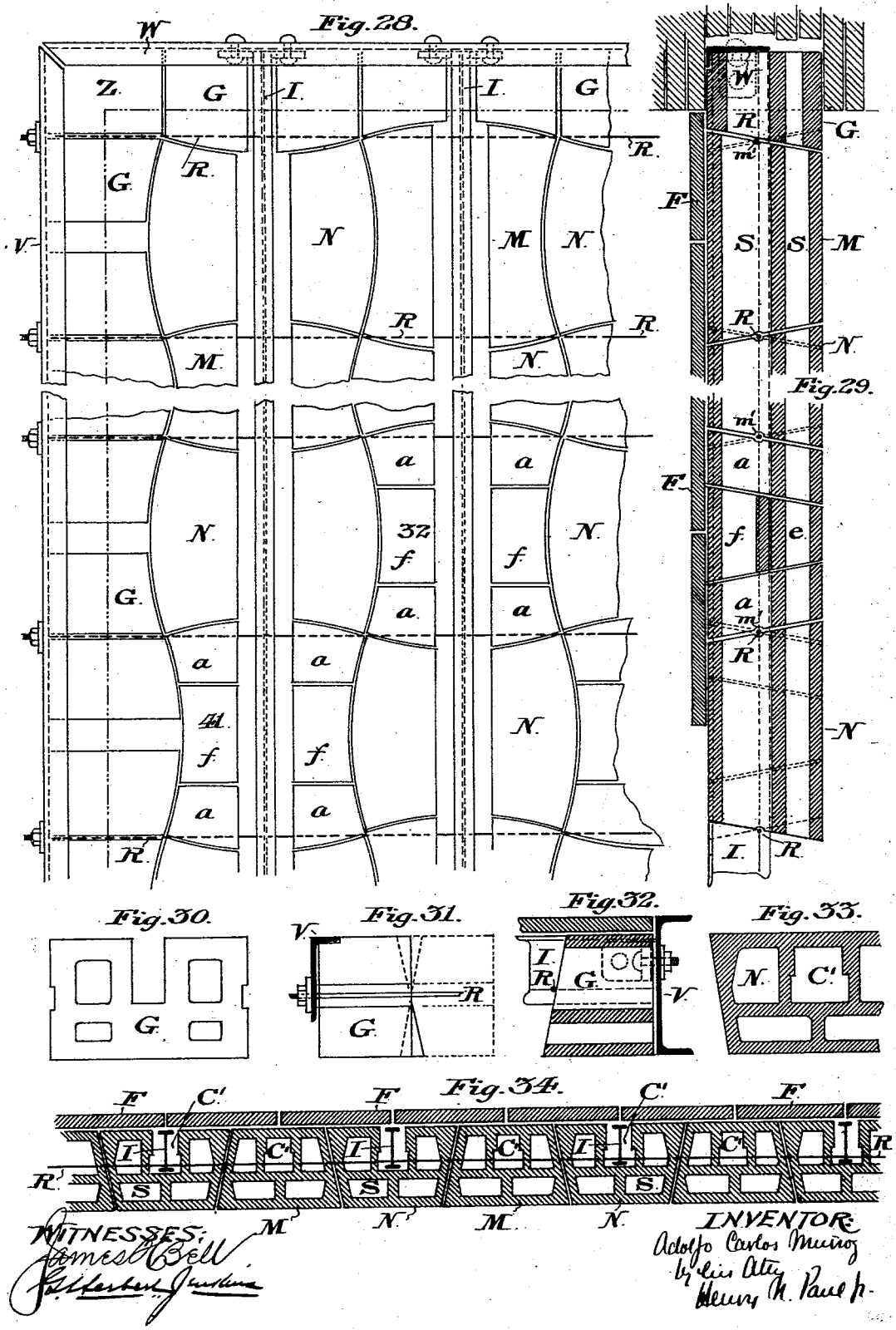
(No Model.) 5 Sheets—Sheet 4.
A. C. MUNOZ.
FLOOR CONSTRUCTION.
No. 572,123. Patented Dec. 1, 1896.

(No Model.) 5 Sheets—Sheet 5.

A. C. MUNOZ.
FLOOR CONSTRUCTION.

No. 572,123. Patented Dec. 1, 1896.

WITNESSES: INVENTOR:

UNITED STATES PATENT OFFICE.

ADOLFO CARLOS MUNOZ, OF PHILADELPHIA, PENNSYLVANIA.

FLOOR CONSTRUCTION.

SPECIFICATION forming part of Letters Patent No. 572,123, dated December 1, 1896.

Application filed December 12, 1895. Serial No. 571,895. (No model.)

*To all whom it may concern:*

Be it known that I, ADOLFO CARLOS MUNOZ, a subject of the King of Spain, residing at Philadelphia, (Chestnut Hill,) in the State of Pennsylvania, have invented certain new and useful Improvements in Floor Construction, whereof the following is a specification, reference being had to the accompanying drawings.

My invention relates to an improved floor construction in which terra-cotta or iron and brick are the chief component materials.

The improvements consist in the employment of beams, which may be very light, arranged in accordance with my invention and embedded in successive courses of terra-cotta or similar blocks, the blocks being so fashioned that of themselves they form an interlocking self-supporting structure. The preferred form of block is one in which two opposite sides curve in toward the center of the block, while the two other opposite sides curve out away from the center, the sides being warped surfaces, while the top and bottom are plane surfaces.

My construction carries with it many advantages, among which are the following:

Exceedingly light iron or steel beams may be employed. The resulting floor is one of increased stiffness, especially against concentrated loads. The metal members of the floor are thoroughly protected against the action of heat and water in case of fire. The use of a temporary floor during construction may be done away with. Continuous air-spaces are provided for ventilating or heating the floor or for the laying of wires, pipes, &c., and, lastly, the floor may be built without skilled labor.

My improved floor in several varying constructions is illustrated in the accompanying drawings, in which—

Figures 1 to 9 illustrate a variety in which the beams are embedded in the upper portion of the floor with tie-rods in the plane of the tops of the beams. Figs. 10 to 18 show a second variety in which the beams are similarly situated, but in which the tie-rods are in the plane of the bottoms of the beams. Figs. 19 to 27 show a third variety in which the beams are embedded in the lower portion of the floor with the tie-rods in the plane of their bottoms. Figs. 28 to 32 show additional details of a floor of the second variety. Figs. 33 and 34 illustrate a floor of the second variety with beams corresponding to every other course of the blocks only instead of to every successive course. Figs. 35 to 46 illustrate floors of the third variety as regards the location of the iron beams, but in which the blocks have plane sides instead of curved ones.

Figure 36:
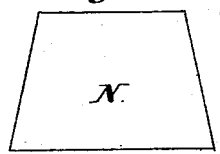
Figure 37:
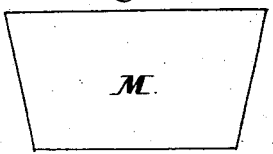
Figure 38:
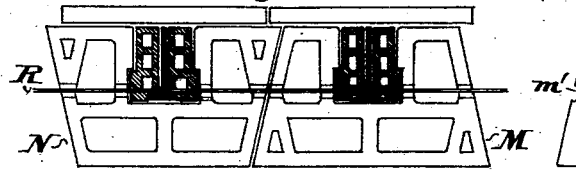
Figure 39:
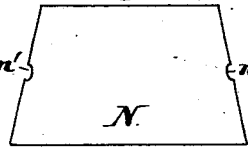
Figure 40:
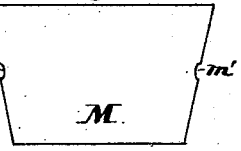
Figure 41:
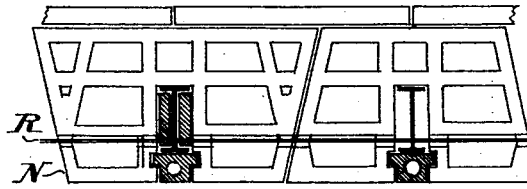
Figure 42:
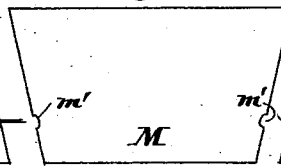
Figure 43:
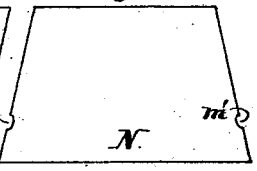
Figure 44:
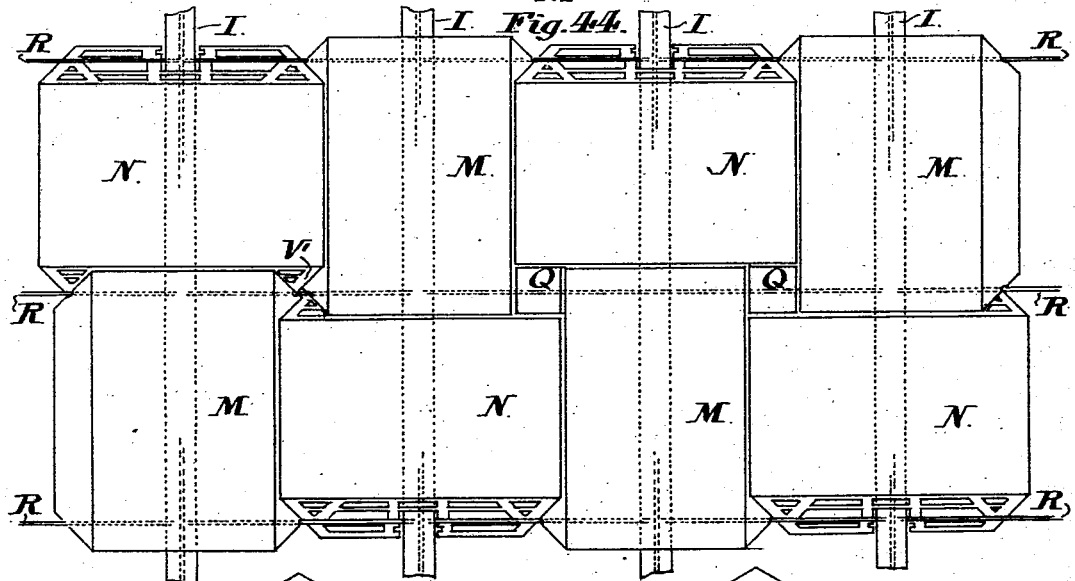
Figures 45, 46:
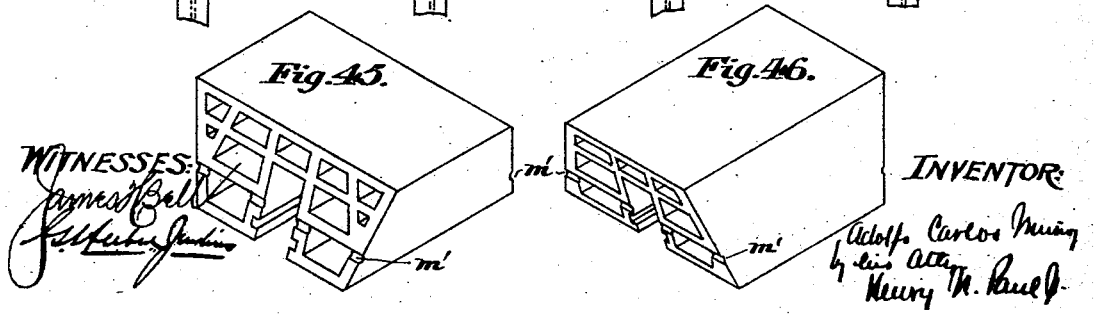

More specifically, Fig. 1 is a section of a floor of the first variety, taken in a plane at right angles to the direction of the beams and corresponding with the line A B in Fig. 2. Fig. 2 is a double section of the same at right angles to the above, the portion to the left of the line A B corresponding to the line C D in Fig. 1 and the portion to the right corresponding to the line E F in Fig. 1. Fig. 3 is a general plan view of a floor of the first variety, the tops of the blocks being indicated by the solid curved lines, while the bottoms are indicated by the dotted lines. Figs. 4 and 5 are side views of the blocks M N, respectively, Fig. 3. Figs. 6 and 7 are front views of the blocks N M, respectively, the two latter figures also indicating the beams in position. Figs. 8 and 9 are isometric views of the blocks M N, respectively. Fig. 10 is a section through a floor of the second variety, taken in a plane at right angles to the direction of the beams and corresponding with the line A B, Fig. 11. Fig. 11 is a double section of the same at right angles to the above, the portion to the left of the line A B corresponding to the line C D, Fig. 10, and the portion to the right corresponding to the line E F, Fig. 10. Fig. 12 is a general plan view of a floor of the second variety, the tops of the blocks being indicated by the solid curved lines, while their bottoms are indicated by the dotted lines. Figs. 13 and 14 are side views of the blocks M and N, respectively, Fig. 12. Figs. 15 and 16 are front views of the blocks N and M, respectively, Fig. 12. Figs. 17 and 18 are isometric views of the blocks M and N, respectively. Fig. 19 is a section of a floor of the third variety, taken in a plane at right angles to the direction of the beams and corresponding to the line A B, Fig. 20. Fig. 20 is a double section of the same at right angles to the above, the portion to the left of the line A B corresponding to the line C D, Fig. 19, and the portion to the right corresponding to the line E F, Fig. 19. Fig. 21 is a general plan view of a floor of the third variety. It will be noted that, as illustrated in Figs. 19 to 21, the beams I are embedded in every other course of the blocks only. Figs. 22 to 25, inclusive, are partial front views of the blocks M N as adapted to the third variety of floor, illustrating different methods by which the embedding of the beam within the groove or channel of the block may be effected. Figs. 26 and 27 are isometric views of the blocks M N, respectively, as adapted to the third variety of floor. Fig. 28 is a general plan view of a floor of the second variety, corresponding, therefore, to Fig. 12, but adding certain details of construction, showing one method of adjusting and supporting the blocks around the edges of the floor. Fig. 29 is a section of Fig. 28, taken parallel to the beams I. Fig. 30 is a front view of the wall-block G. Fig. 31 is a side view of the same, the solid lines indicating its smallest size and the dotted lines the largest. Fig. 32 illustrates the end of a beam I, supported by a girder instead of resting on the wall, as shown in Fig. 29. Fig. 33 is a partial section through the block N, corresponding to the course in which no beams are used and in which the central channel is therefore closed. Fig. 34 shows a section of a floor of the second variety in which beams are used in every other course of the blocks only. Fig. 35 shows a front view of two blocks in a floor of the first variety, but with plane sides. Figs. 36 and 37 are side views of the blocks N and M, Fig. 35, respectively. Fig. 38 shows a front view of the blocks in a floor of the second variety, but with plane sides. Figs. 39 and 40 are side views of the blocks N and M of Fig. 38, respectively. Fig. 41 shows a front view of two blocks in a floor of the third variety, but with plane sides. Figs. 42 and 43 are side views of the blocks M and N of Fig. 41, respectively. Fig. 44 is a plan view of the floor shown in Fig. 41. Figs. 45 and 46 are perspective views of the blocks N and M of Fig. 41, respectively.

Before describing in detail the varieties of floors illustrated in the figures I wish it to be borne in mind that the principle of construction which is embodied in all of them consists in the combination of a skeleton of iron girders with a floor composed of terra-cotta or similar blocks, the blocks being so shaped, with two opposite sides beveled toward the center and the two other opposite sides beveled away from the center, that they may be interlocked, so that the blocks of themselves form a self-supporting structure. The method of combination which I employ involves the embedding of an iron or steel girder in at least every other course of the blocks, so that every course of blocks is either directly, or through the medium of its immediately-adjacent courses, supported by the girder itself. By thus embedding the girders in successive courses of blocks in the shape described it is practically impossible for any block to move from its place without disengagement from the girder which binds them together, while at the same time the girder system, which may be very light, gains in stiffness by being keyed or attached to the system of interlocking self-supporting blocks. This necessitates the employment of a greater number of beams than has heretofore been customary, placed closely together, though, as above stated, they are comparatively light beams. When they are used in every course of blocks, they are about twelve inches apart. The lightness of the beams does not, however, mean a corresponding weakness of the floor, because in addition to the strengthening of the beams by the blocks when in position the blocks of themselves, by their interlocking system, are self-supporting, so as to relieve the beams entirely of their own weight as an element of strain; and they are also, to some extent, capable of themselves of supporting the load on the floor, thus reducing the weight which falls on the beams. Furthermore, the beams are not designed to take up the bending strains, for which heavier beams are required, but they act as ties to take up the tension strains that exist at the bottom of the floor. The beams are shown throughout as further strengthened by a system of tie-rods running at right angles to them, which further compensate for their lightness. Incidental advantages are obtained by the embedding of the beams in the blocks on account of the protection given to them from the effect of heat in case of fire; also the construction lends itself to an arrangement of air-spaces in the blocks, which may be used conveniently for ventilation or heating.

In order to make the blocks self-supporting, they are constructed in the preferred form of blocks, as above described, with two opposite sides curved in and two others curved out in similar curves, having reference to the top plane of the blocks, so that the convex sides will fit into the concave ones of the adjoining blocks, and vice versa. From the tops down the convex sides are beveled inwardly, while the concave sides are beveled outwardly. Furthermore, in the course of the descent of the bevel the curvature is gradually diminished until at one point a straight line is reached as representing the edge of a horizontal cross-section at that plane. In some cases the warped surfaces thus formed are prolonged even farther with a curvature in the opposite direction. That is to say, with the descent of the bevel the edge of the section which had been concave becomes convex, and vice versa. In every case, however, there is one point at which the horizontal cross-section of the blocks remains an exact square, which horizontal section is important as marking the plane in which the tie-rods or cables which connect the beams are placed, in order that they may run between the blocks and in straight lines.

There are other forms of opposite-beveled blocks which are capable of forming an interlocking structure of the same generic kind as that which is formed by the blocks which I have just described, and these may be substituted, if desirable, without departing from the principle of my invention, as shown by Figs. 35 to 46, in which the blocks have plane sides. The form, however, which I have first described is preferable in that it leaves no spaces at the corners where four blocks come together which require to be subsequently filled, as is the case with the blocks shown by Figs. 35 to 46, where the spaces V′, Fig. 44, are closed by small square tiles Q.

In the manufacture of the blocks with warped sides they are cut to the required shape by a wire, one point of which advances in a straight line perpendicular to the plane to which the wire is always parallel, another point of the wire being made to move along a curved line. Thus, for example, in Fig. 8 $m\,n$ is the straight and, similarly, $o\,p\,q$ the curved direction of the wire. In the manufacture of the blocks with plane sides they are also cut with a wire and in the usual manner.

Coming now to the first variety of floor, as illustrated in Figs. 1 to 9, it will be observed that the steel beams I, which are here shown in the form of deck-beams, correspond with the central line of every course of blocks. At right angles to the beams run a series of tie-rods or wires R at convenient intervals. The tie-rods R are here shown in a plane entirely outside and above the space formed by the interlocking blocks, being very nearly the plane of the tops of the beams. This method of construction is chiefly designed for an overhanging floor supported at one end only, in which case the tension existing in the upper part of the floor may be taken up by the tie-rods and the upper flanges of the beams, while the compression is taken up by the bottoms of the blocks. The blocks employed in this variety of floor are illustrated in perspective in Figs. 8 and 9, their top surfaces being bounded by curves, as shown, while the bottom surfaces occur at the plane in which the beveled sides have become straight, so that the bottoms are perfect squares. A large groove or channel C′ is cut from one side of the block to the other at the top, passing through the center, and there are necessarily two varieties of blocks, (shown, respectively, in Figs. 8 and 9,) in the first of which the groove runs across between the convex sides and in the second between the concave sides, thus corresponding to the two positions in which the blocks are alternately placed along the line of any one of the beams. Corresponding to the direction of the channel for the reception of the beams are a series of interior channels or spaces S, which lighten the block and also serve for ventilation, as hereinafter described.

The space between the edges of the channel and the beam is shown in Fig. 1 as filled with concrete. The edges of the channel are shown of a corrugated shape, so that the cement enters the corrugations and causes the beam to support the blocks. In Figs. 6 and 7 this support is obtained by smaller wedge-shaped blocks $b$ in place of the cement. The beams are here shown in the form of I-beams, and in Fig. 7 the channel is shown larger at the bottom than at the top, so as to form a key for the blocks $b\,b$, while in Fig. 6 this is done by a shoulder. The blocks $b$ correspond in shape to the outline of the channel and to that of the beam, thus locking them together. As in this form the tie-rods R are entirely above the blocks they may be situated without reference to the joints between the blocks. As an alternative construction, however, a very shallow channel $v$, Figs. 4 and 5, may be cut across the blocks at right angles to the larger channels which contain the beams, and the tie-rods may be allowed to enter these smaller channels. Above the blocks the space to the plane of the tops of the beams may be filled with concrete or cement, as shown in Figs. 1, 6, and 7, and above this the ordinary floor may be laid.

Coming to the second variety of floor, as illustrated in Figs. 10 to 18, it will be seen that it differs from the last variety chiefly in that the tie-rods are situated in the plane of the bottoms of the beams. This construction is preferred for ordinary floors, roofs, &c., supported on two opposite sides. The tension here is at the bottom and is taken up by the bulbs of the beams I, or, generally speaking, by the bottom portion of the beams I, which may vary in shape, and also by the rods R, attached to the lower portion of the beams. The compression which occurs at the upper portion of the floor is taken up by the tops of the blocks and by the tiles F, or by the layer of cement or concrete that may replace them. The shape of the blocks employed in this construction varies from that just described in that the bevel is continued past the plane in which its horizontal cross-section is straight until its curvature is precisely reversed. That is to say, the sides which are convex at their top corner are concave at their lower corner, and vice versa, the result being that the tops and bottoms of the blocks form similar figures placed at right angles to each other, while the central horizontal cross-sections of the blocks form exact squares. The tie-rods R pass between the sides of the blocks at the plane in which the square cross-sections occur, a small channel $m$ being provided to receive them. The rods may be inserted between every or between every second or third, &c., course of blocks. As before, the blocks may be fastened to the beams by a cement filling, as shown in Fig. 10, or by the wedge-shaped pieces shown in Figs. 15 and 16. Above the blocks and covering the tops of the beams tiles F may be fitted, which may be shaped so as to bind the blocks together, as shown, and may also form the finished floor. As before, these tiles may be replaced by a layer of cement or concrete, &c. In this variety, as in all, the beams may be laid to correspond with every other course of blocks only. This arrangement is shown in Fig. 34, the only difference being that some of the blocks—i. e., those which occupy the alternate courses between the beams—are made with the channel C' closed at the top and thus converted into an air-space.

The third variety of floor, which is illustrated in Figs. 19 to 27, differs from those previously described in that the blocks, instead of depending from the system of beams, are inverted in position and have the groove or channel C', in which the beams are situated, in the lower portion of the blocks, so that the system of blocks rests upon the system of beams. The tie-rods are here shown as near the bottom of the beams, but still within the space occupied by the blocks. To correspond with this, the blocks are formed with a bevel in accordance with which the square cross-section occurs near the bottom of the blocks. The channel C' is shown in Fig. 19 as filled with pieces $b$ upon either side of the beam and a bottom piece $d$ closing the remaining space. Figs. 22 to 25 illustrate varying methods of filling this space according to the shape of the cross-section of the beam, which requires no further explanation.

The three varieties which I have just described must, however, be understood to be only typical of the varieties to which a moment's consideration will show that this method of construction lends itself. Thus these three varieties are also shown in Figs. 35 to 46 composed of blocks having plane sides instead of warped ones. In all of these constructions the tendency of the blocks to spread laterally is wholly counteracted. The tendency to spread in the direction parallel to the beams is counteracted by the beams, assisted by the manner in which the convex sides of the blocks fit into the concave sides of the opposing blocks, and vice versa, while the tendency to spread in the direction parallel to the tie-rods is counteracted by the tie-rods, assisted also by the fitting edges, as just described.

In Figs. 28 and 29 a portion of a floor constructed in accordance with my invention is shown, illustrating the method of supporting the floor on a wall. For this purpose wall-blocks G and corner-blocks Z are employed. The wall-blocks differ from the main blocks M N in that they have only one warped side, convex or concave, while all the other sides are vertical planes. Their length is equal to that of the blocks M and N at their square section, while their width varies according to the span of the floor, it being necessary that they should make up the difference between the span and the greatest number of main blocks which the span contains. These wall-blocks may be omitted and replaced by the main blocks, cut to fit the required span. Behind these wall-blocks runs an angle-iron W, to which the beams I are bolted. Likewise along the sides which are parallel with the beams an angle-iron V is run behind the wall-blocks, to which the tie-rods are attached. Instead of an angle-iron a channel-iron may be used, as shown in Fig. 32, or, in fact, any convenient shape of beam. After the beams I are in position, resting at one end on the wall-blocks G or bolted to the beam W, the other being temporarily supported, the blocks M and N are laid in regular rows running at right angles to the beams, finishing each row with wall-blocks and laying the tie-rods R as the work progresses. These rods R may be made in sizes corresponding to the length of every fifth and sixth, &c., beam, or may be made in one piece running from end to end of the floor and between the beams V. The beams V may be made in one piece, as shown in Fig. 28, or may be made in pieces which are placed in position as the construction progresses. The last course is laid by removing gradually the temporary supports of the beams and replacing them by wall-blocks. This done, the iron beam W, corresponding to the end of the floor, (not shown,) is laid and bolted to the beams I.

The rows of blocks may be laid starting from both ends simultaneously; but this is not of much advantage, as then the blocks closing the row would have to be made and laid in pieces, as illustrated in Figs. 28 and 29, wherein certain of the blocks (blocks 32 and 41, Fig. 28) consist of two side portions $a\ a$ and a central wedge, which latter is itself horizontally subdivided into a bottom piece $e$ and top pieces $f\ f$.

Some of the advantages of the floor may be briefly rehearsed. The lightness of the beams generally used renders the floor light, easier of construction, and therefore more economical. The shape of the blocks and the manner in which they interlock makes a floor of great stiffness, for as each block is supported by two other blocks its load is transferred successively to every block in the floor, and therefore to every beam and to all the bearing-surface of the wall, and therefore will produce the smallest bending movement or deflection at the point of application of the load. In all the forms that have been shown the iron portion of the structure is completely inclosed on all sides, so that in case of a fire breaking out underneath any one of the floors the iron-work above is protected from the ascending hot air. Temporary floors need not be used during construction, thus saving both time and expense. The air-spaces, which have been referred to, are continuous, running from end to end of the floor, thus forming passages which may be used for ventilation or for containing pipes, wires, &c. Finally, ordinary labor is all that is required in the construction of this floor The iron beams, being light, are easily handled and the blocks easily laid in place. Even the riveting (shown in Figs. 28 and 29) may be replaced by bolts, as shown in Fig. 32.

Having thus described my invention, I claim—

1. A floor construction consisting of similar terra-cotta blocks with edges slanting alternately in opposite directions, said blocks being arranged in courses, and interlocking in two directions at right angles to each other; in combination with a series of iron or steel beams to one of which at least every other course of blocks is secured, substantially as described.

2. A floor construction consisting of similar terra-cotta blocks with edges slanting alternately in opposite directions, said blocks being arranged in courses, and interlocking in two directions at right angles to each other; medial grooves in said blocks forming continuous channels along the courses in one direction; in combination with a series of iron or steel beams corresponding to and received within the channels of at least every other course of blocks, substantially as described.

3. A floor construction consisting of similar terra-cotta blocks with edges slanting alternately in opposite directions, said blocks being arranged in courses, and interlocking in two directions at right angles to each other; medial grooves in said blocks forming continuous channels along the courses in one direction; in combination with a series of iron or steel beams, strengthened at right angles with tie-rods, said beams corresponding to and being received within the channels of at least every other course of blocks, substantially as described.

4. A floor construction consisting of similar terra-cotta blocks with edges slanting alternately in opposite directions, and a square cross-section at a given horizontal plane, said blocks being arranged in courses, and interlocking in two directions at right angles to each other; medial grooves in said blocks forming continuous channels along the courses in one direction; in combination with a series of iron or steel beams, strengthened at right angles with tie-rods, said beams corresponding to and being received within the channels of at least every other course of blocks, and said tie-rods being embedded between the blocks at the plane of the square cross-section, substantially as described.

5. A floor construction consisting of similar terra-cotta blocks with edges slanting alternately in opposite directions, said blocks being arranged in courses, and interlocking in two directions at right angles to each other; medial grooves in said blocks forming continuous channels along the courses in one direction; in combination with a series of iron or steel beams corresponding to and received within the channels of at least every other course of blocks, the said beams being secured to their channels by a series of smaller blocks wedged into the interstices, substantially as described.

6. A floor construction consisting of two similar sets of terra-cotta blocks with edges slanting alternately in opposite directions, with air-spaces running through said blocks in one direction, which direction in one set of blocks is at right angles to the direction in the other set of blocks, said blocks being arranged in courses in which the sets alternate, and interlocking in two directions at right angles to each other, the air-spaces thus forming continuous straight and uninterrupted passages of uniform cross-section throughout the length of each course in one direction, substantially as described.

7. A terra-cotta block for floor construction having a flat top, two opposite edges of which are convex and the other two opposite edges concave, with edges consisting of warped surfaces slanting alternately in opposite directions, substantially as described.

8. A terra-cotta block for floor construction having a flat top, two opposite edges of which are convex and the other two opposite edges concave, with edges consisting of warped surfaces slanting alternately in opposite directions, and having a square horizontal cross-section at a plane which either forms the bottom or between the top and bottom of the block, substantially as described.

ADOLFO CARLOS MUNOZ.

Witnesses:
G. HERBERT JENKINS,
JAMES H. BELL.